(12) United States Patent
Toma

(10) Patent No.: US 6,962,262 B2
(45) Date of Patent: Nov. 8, 2005

(54) CONNECTING CORNER FOR KNOCK DOWN RACKS

(76) Inventor: Dennis Toma, 10016 Summit Canyon Dr., Las Vegas, NV (US) 89144

( * ) Notice: Subject to any disclaimer, the term of this patent is extended or adjusted under 35 U.S.C. 154(b) by 0 days.

(21) Appl. No.: 10/361,403

(22) Filed: Feb. 10, 2003

(65) Prior Publication Data

US 2004/0155002 A1 Aug. 12, 2004

(51) Int. Cl.⁷ .................................................. A47F 5/14
(52) U.S. Cl. ...................................... 211/182; 211/189
(58) Field of Search ................................. 211/182, 189; 312/265.1, 265.4; 403/170, 171, 173, 176, 403/403, 382, 230, 231, 187, 188

(56) References Cited

U.S. PATENT DOCUMENTS

| | | | | |
|---|---|---|---|---|
| 3,695,649 A | * | 10/1972 | Leverone ..................... | 403/231 |
| 4,455,102 A | * | 6/1984 | Baroi et al. ................. | 403/173 |
| 4,493,425 A | * | 1/1985 | Yoshida ....................... | 211/189 |
| 4,592,671 A | * | 6/1986 | Daum ......................... | 403/171 |
| 4,610,561 A | * | 9/1986 | Cecchellero et al. ........ | 403/171 |
| 4,678,359 A | * | 7/1987 | Keen, Egbert ............. | 403/170 |
| 4,712,942 A | * | 12/1987 | Brown ........................ | 403/174 |
| 5,013,176 A | * | 5/1991 | Orbom ........................ | 403/171 |
| 5,116,161 A | * | 5/1992 | Faisst ......................... | 403/231 |
| 5,399,044 A | * | 3/1995 | Gilb ............................ | 403/231 |
| 5,425,203 A | * | 6/1995 | Scott ............................ | 47/70 |
| 5,498,099 A | * | 3/1996 | Scheuer ....................... | 403/403 |
| 5,516,225 A | * | 5/1996 | Kvols ........................... | 403/170 |
| 5,692,333 A | * | 12/1997 | McClave ...................... | 40/785 |
| 5,732,496 A | * | 3/1998 | Tanaka ......................... | 40/784 |
| 5,799,430 A | * | 9/1998 | Fremstad ...................... | 40/785 |
| 5,918,998 A | * | 7/1999 | Pourmand .................... | 403/218 |
| 5,927,893 A | * | 7/1999 | Imamura et al. ............. | 403/270 |
| 6,006,925 A | | 12/1999 | Sevier | |
| 6,089,778 A | * | 7/2000 | Hirano et al. ................ | 403/231 |
| 6,179,398 B1 | * | 1/2001 | Martin ....................... | 312/265.4 |
| 6,591,571 B2 | * | 7/2003 | Fritsche et al. ............. | 52/655.1 |
| 6,682,256 B1 | * | 1/2004 | Hor .............................. | 403/382 |
| 2001/0006163 A1 | * | 7/2001 | Scudeller ..................... | 211/182 |
| 2002/0006312 A1 | * | 1/2002 | Buard ......................... | 403/403 |
| 2003/0223810 A1 | * | 12/2003 | Jadaud et al. ............... | 403/382 |

\* cited by examiner

*Primary Examiner*—Jennifer E. Novosad
(74) *Attorney, Agent, or Firm*—Jeffrey Weiss; Harry M. Weiss; Weiss, Moy & Harris, P.C.

(57) ABSTRACT

A metal connecting corner used in assembling a rack frame comprises three leg portions with each one of the leg portions of the connecting corner having three inner slots, each slot accepting a metal rail having a plurality of holes. Each slot is supported by a double-sided overlapping tapered reinforcing rib. The connecting corner further comprises a rail stop embossment which prevents each one of the rails in each one of the slots from making contact with another rail in another slot of the connecting corner. The connecting corner further comprises a corner base having four holes and a supplemental threaded hole. Each leg portion of each connecting corner has four holes which match up, and align, with the holes at each end of each of the metal rails, and a plurality of fasteners are used to secure each end of each rail in the connecting corner.

18 Claims, 6 Drawing Sheets

CONNECTING CORNER FOR KNOCK DOWN RACKS

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND OF THE INVENTION—KNOCK-DOWN RACKS

This invention relates to knocked-down racks, specifically to such racks that are used for housing electronic industry standard rack width equipment.

BACKGROUND OF THE INVENTION

Manufacturers supply the consumer marketplace with equipment enclosures and equipment rack enclosures for housing equipment. Such equipment enclosures and equipment rack enclosures are also supplied to provide a reasonable structure for rack mountable industry standard electronic equipment.

Currently, these enclosures are supplied fully assembled. However, consumers complain about the permanent characteristics of the assembled enclosure. These enclosures are not adjustable without great difficulty and the cost of shipping a fully assembled unit is expensive.

Thereafter, several types of enclosures were established that could ship knocked-down. These enclosures reduced freight costs but did not address the issue of ease of assembly. It is necessary to include a special kind of tool or specialty hardware to assemble. Consequently, enclosure assembly takes a long time and the parts are cumbersome and difficult to maneuver.

Knocked-down enclosures are easier to use and less expensive to ship, but they do not possess the ease of assembly and simplicity of design. These type of enclosures suffer from a number of disadvantages:

(a) The enclosure strength comes from the thickness of the manufactured materials making the unit heavier than need be. Additional assembled parts provided for strength become unnecessary if addressed through effective design.

(b) The assortments of parts are many, cumbersome, and difficult to assemble.

(c) There is a limited standardized size selection in all three-enclosure dimensions (width, depth and height).

(d) Limitations in size selections compel the consumer to custom order special sizes for simple racking applications.

(e) Custom orders take extended time to manufacture, cost more to produce and deliver, and are easily incorrectly communicated and consequently frequently delivered inaccurately.

(f) Incorrect custom orders must be returned to the manufacture for credit and cost the consumer time and money. The process of waiting for refunds, or credit to be issued, leaves the consumer frustrated, and in spite of everything the end result is no effective and operational rack enclosure, and consequently no solution in sight for their initial packaging problems.

BACKGROUND OF INVENTION—OBJECTS AND ADVANTAGES

Several objects and advantages of the present invention are:

(a) To provide a rack enclosure with extreme strength and stability rendered from the design and structure of a unique connecting corner.

(b) To provide a connecting corner that allows for variable sized sets of rails to form a basic rectangular frame structure.

(c) To provide a corner concept that allows for knock-down ability and ease of assembly.

(d) To provide the consumer with many shapes, sizes, and configurations of rack enclosure using a specially designed connecting corner.

Further objects and advantages are to provide a rack enclosure that can be used easily and conveniently assembled and unassembled without damage to assembled parts. A simple and inexpensive item to manufacture, which can be supplied separately, and used repeatedly, and which after assembly delivers to the consumer an extremely strong and reliable enclosure for housing industry standard equipment. Still further objects and advantages will become apparent from ensuing descriptions and drawings.

SUMMARY

In accordance with the present invention, a connecting corner is a three-sided metal corner with three slotted openings and specially position assembly holes to secure various sized sets of rack rails, which form the basic structure of a rack frame enclosure.

PREFERRED EMBODIMENTS OF THE INVENTION

According to one embodiment of the invention, a corner connector for a rack frame is disclosed. The corner connector comprises in combination, a base member having a plurality of holes and a reinforcing rib coupled to the base member; a pair of leg members, each having a plurality of holes, each one of the pair of leg members including a reinforcing rib coupled to each one of the pair of leg members, a first leg member of the pair of leg members substantially perpendicular to a second leg member of the pair of leg members and each one of the pair of leg members substantially perpendicuiar to the base member. A portion of the base member includes a rail stop adjacent to a portion of each one of the pair of leg members. A portion of the base member and a portion of the first leg member of the pair of leg members have a first inner slot, a portion of the base member and a portion of the second leg member of the pair of leg members have a second inner slot, and a portion of the first leg member and a portion of the second leg member have a third inner slot. The rack frame includes a plurality of rail members, each rail member of the plurality of rail members having a plurality of holes. The first inner slot receives one end of a first rail member of the plurality of rail members, the second inner slot receives one end of a second rail member of the plurality of rail members and the third inner slot receives one end of a third rail member of the plurality of rail members, the rail stop preventing contact of the one end of the first rail member with both the one end of the second rail member end the one end of the third rail member. A plurality of fasteners adapted to selectively couple the plurality of rail members to the base member and to each one of the pair of leg members of the corner connector thereby provides a corner portion of the rack frame.

According to a second embodiment of the invention, a rack frame is disclosed. The rack frame comprises, in combination, a plurality of rail members, each one of the rail members having a plurality of holes. The rack frame further comprises a plurality of corner connectors, each one of the plurality of corner connectors including a base member having a plurality of holes, and a reinforcing rib coupled to the base member, a pair of leg members, each having a plurality of holes, each one of the pair of leg members including a reinforcing rib coupled to each one of the pair of leg members, a first leg member of the pair of leg members substantially perpendicular to a second leg member of the pair of leg members, each one of the pair of leg members substantially perpendicular to the base member, a portion of the base member and a portion of the first leg member of the pair of leg members having a first inner slot, a portion of the base member and a portion of the second leg member of the pair of leg members having a second inner slot, a portion of the first leg member and a portion of the second leg member having a third inner slot, and a portion of the base member including a rail stop adjacent to a portion of each one of the pair of leg members. The first inner slot of each one of the plurality of corner connectors receives one end of a first rail member of the plurality of rail members. the second inner slot of each one of the plurality of corner connectors receives one end of a second rail member of the plurality of rail members and the third inner slot of each one of the plurality of corner connectors receives one end of a third rail member of the plurality of rail members, the rail stop preventing contact of the one end of the first rail member with both the one end of the second rail member and the one end of the third rail member. The rack frame further comprises a plurality of fasteners adapted to selectively couple each one of the plurality of rail members to the base member and to each one of the pair of leg members of each one of the plurality of corner connectors thereby providing at least a portion of the rack frame. The rack frame comprises at least 8 corner connectors of the plurality of corner connectors, at least 12 rail members of the plurality of rail members and at least 96 fasteners of the plurality of fasteners. Each one of the at least 12 rail members of the plurality of rail members have the same length thereby providing a cube shaped rack frame. Each one of a first set of 4 rail members of the 12 rail members have the same length and each one of a second set of 8 rail members of the 12 rail members have the same length, the first set of the 12 rail members being of different length to said second set of the 12 rail members thereby providing a rectangular prismatic shaped rack frame. Alternatively, each one of a first set of 4 rail members of the 12 rail members having the same length, each one of a second set of 4 rail members of the 12 rail members having the same length and a third set of 4 rail members of the 12 rail members having the same length, the first set of the 12 rail members being of different length to the second set of the 12 rail members and the third set of the 12 rail members begin of different length to both the first set of 4 rail members and the second set of 4 rail members thereby providing a rectangular prismatic shared rack frame.

According to a third embodiment of the invention, a method for assembling a frame rack is disclosed. The method comprises the step of providing a plurality of rail members, each one of the rail members having a plurality of holes. The method further comprises the step of providing a plurality of corner connectors, each one of the plurality of corner connectors including a base member having a plurality of holes, and a reinforcing rib coupled to the base member, a pair of leg members, each having a plurality of holes, each one of the pair of leg members including a reinforcing rib coupled to each one of the pair of leg members, a first leg member of the pair of leg members substantially perpendicular to a second leg member of the pair of leg members, each one of The pair of leg members substantially perpendicular to the base member, a portion of the base member and a portion of the first leg member of the pair of leg members having a first inner slot, a portion of the base member and a portion of the second leg member of The pair of leg members having a second inner slot, a portion of the first leg member and a portion of the second leg member having a third inner slot, and a portion of the base member including a rail stop adjacent to a portion of each one of the pair of leg members. The method yet further comprises the step of providing the first inner slot of each one of the plurality of corner connectors receiving one end of a first rail member of the plurality of rail members, the second inner slot of each one of the plurality of corner connectors receiving one end of a second rail member of the plurality of rail members and the third inner slot of each one of the plurality of corner connectors receiving one end of a third rail member of the plurality of rail members, the rail stop preventing contact of the one end of the first rail member with both the one end of the second rail member and the one end of the third rail member. The method still further comprises the step of providing a plurality of fasteners adapted to selectively couple each one of The plurality of rail members to the base member and to each one of The pair of leg members of each one of the plurality of corner connectors thereby providing at least a portion of the rack frame. The method further comprises the steps of coupling a first set of four rail members of The plurality of rail members to four of the corner connectors of the plurality of corner connectors with a plurality of fasteners thereby forming a first frame; coupling a second set of four rail members of the plurality of rail members to a further four corner connectors of the plurality of corner connectors with a plurality of fasteners thereby forming a second frame; and coupling one end of each one of a third set of four rail members of the plurality of rail members to the four corner connectors of the first frame and an opposite end of each one of the third set of four rail members of the plurality of rail members to the further four corner connectors of the second frame Thereby forming the rack frame.

The foregoing and other objects, features, and advantages of the invention will be apparent from the following, more detailed description of the preferred embodiments of the invention, as illustrated in the accompanying drawings.

DRAWING—FIGURES

In the drawings, closely related figures have the same number but different alphabetic suffixes.

Figure 1:
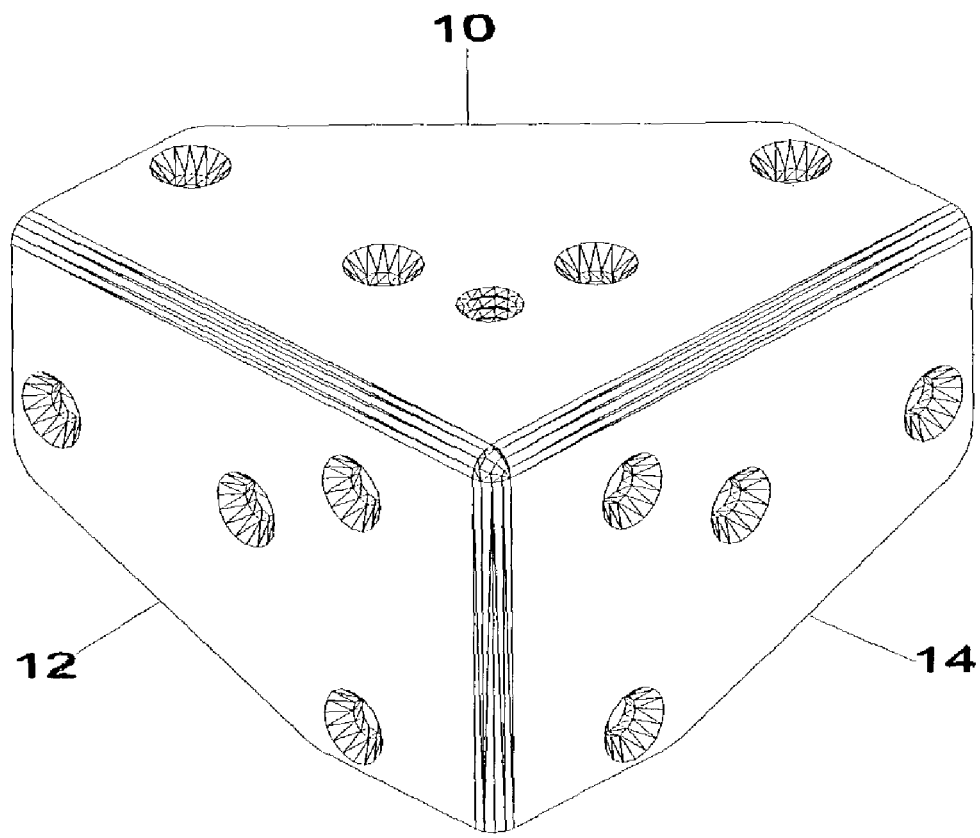
FIGS. 1 and 1A illustrates various perspective views of a connecting corner supplying a full outer view, and a detailed outer view.

DRAWINGS—REFERENCE NUMERALS 10 base
12 left outer leg
14 right outer leg
16 base left outer counter sunk hole
18 base left inner counter sunk hole
20 base right outer counter sunk hole
22 base right inner counter sunk hole
24 base threaded hole
26 left leg outer counter sunk hole
28 left leg inner counter sunk hole
30 left leg upper counter sunk hole
32 left leg lower counter sunk hole
34 right leg outer counter sunk hole
36 right leg inner counter sunk hole
38 right leg upper counter sunk hole
40 right leg lower counter sunk hole
42 left leg rack rail entry slot
44 right leg rack rail entry slot
46 vertical leg rack rail entry slot
48 rail stop embossment
50 base tapered reinforcement rib
52 left leg tapered reinforcement rib
54 right leg tapered reinforcement rib
56 surface plating
58 rack rail
60 rack rail repeating hole pattern hole one
62 rack rail repeating hole pattern hole two
64 rack rail repeating hole pattern hole three
66 rack rail repeating pattern marker

DETAILED DESCRIPTION

Figure 1A:
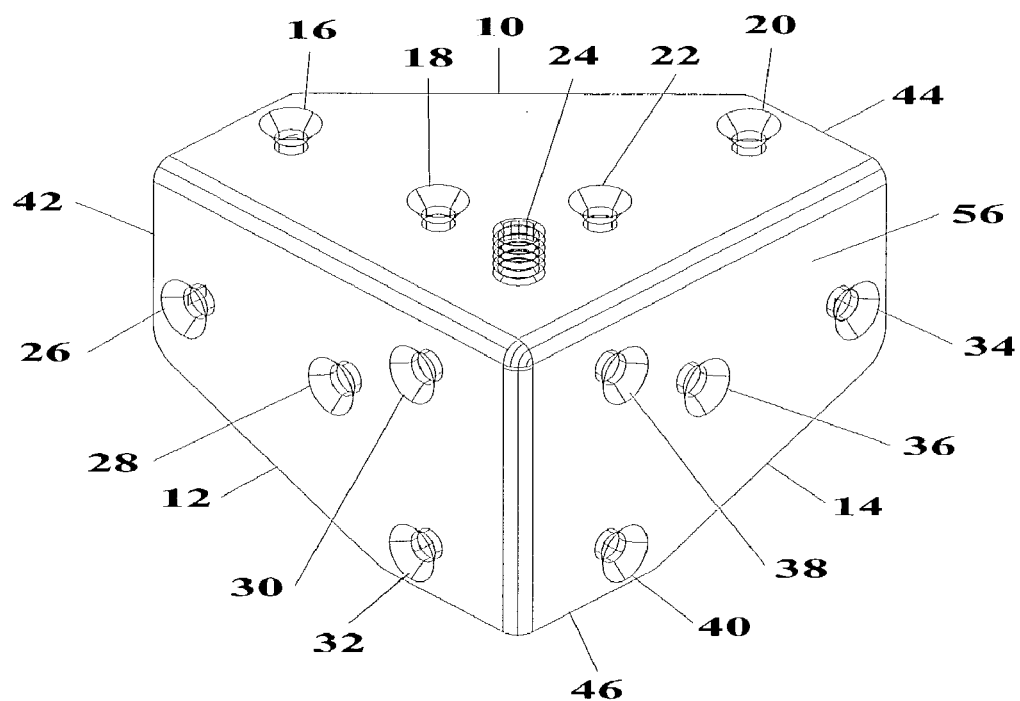

FIGS. 1 and 1A—Outer Embodiment

An outer embodiment of the connecting corner of the present invention is illustrated in FIG. 1 (full outer view) and FIG. 1A (detailed outer view). The connecting corner has a solid body of uniform cross section consisting of a solid metal, which is formed or molded. A layer of (black clad finish) plating 56 covers all the surfaces of the corner. In the outer embodiment, the body is made of metal, such as cast aluminum. However, the body can consist of any other material that can be formed or molded without fracturing, such as aluminum, molded plastic, such as polyethylene, polypropylene, rubber, various impregnated or fibrous materials, various plastic material, that can withstand the stress and various weight factors.

Base 10 of connecting corner has counter sunk hole 16 and hole 18 positioned to match up with holes in one surface of rack rail inserted in left leg rack rail entry slot 42. Counter sunk hole 20 and hole 22 are positioned to match up with holes in one surface of rack rail inserted in right leg rack rail entry slot 44. Threaded hole 24 is positioned to accommodate other items, such as leveling feet, casters, and either anchoring or attaching other accessory items.

Left outer leg 12 has counter sunk hole 26 and hole 28 positioned to match up with holes in other surface of rack rail previously inserted into slot 42. Counter sunk hole 30 and hole 32 are positioned to match up with holes in one surface of rack rail inserted into vertical leg rack rail entry slot 46.

Right outer leg 14 has counter sunk hole 34 and hole 36 positioned to match up with holes in other surface of rack rail previously inserted into slot 44. Counter sunk hole 38 and hole 40 are positioned to match up with holes in other surface of rack rail previously inserted into slot 46.

Connecting corner base 10 is typically 3.988 mm in thickness, and has overall dimensions roughly from 78.6007 mm×78.6007 mm (square shape). The outer edges of the corner are typically beveled or rounded to avoid snagging and personal injury.

Left leg 12 and right leg 14 of the corner are mirror images of each other. Each leg is typically 3.988 mm wall thickness, and has overall dimensions roughly from 78.6007 mm×50.80 mm (rectangular shape). Outer edges of each leg of the corner are typically beveled or rounded to avoid snagging and personal injury.

Figure 2:
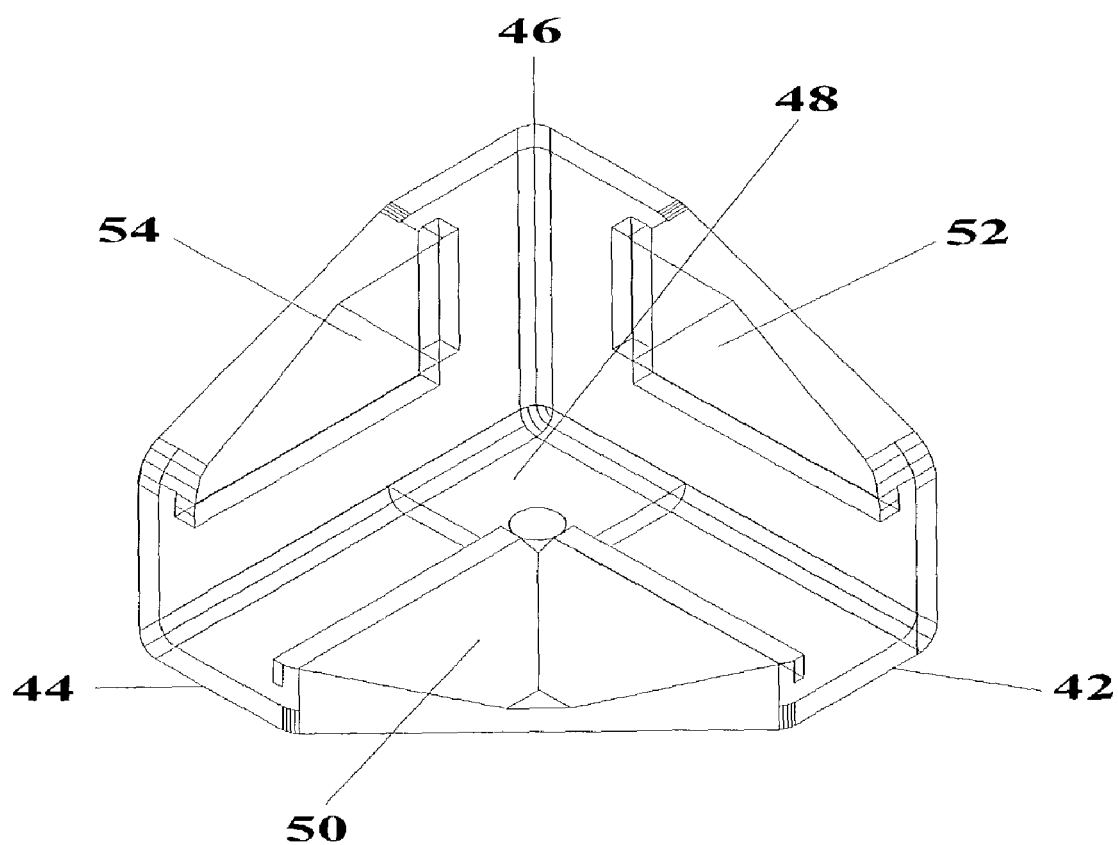
FIGS. 2 and 2A illustrates perspective inner views of a connecting corner.
Figure 3:
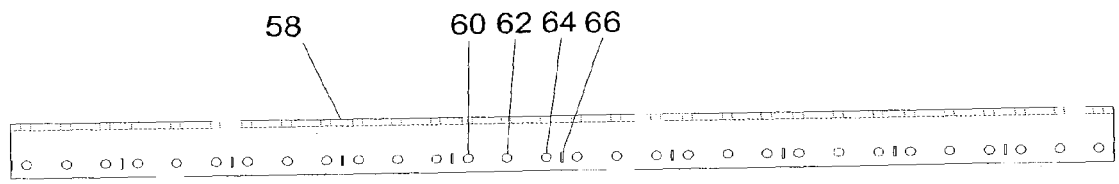
FIG. 3 shows a linear view illustrating an industry standard rack rail, and detailing an industry standard incrementally repeating hole pattern.

FIGS. 2–3 Addition Embodiments

Figure 2A:
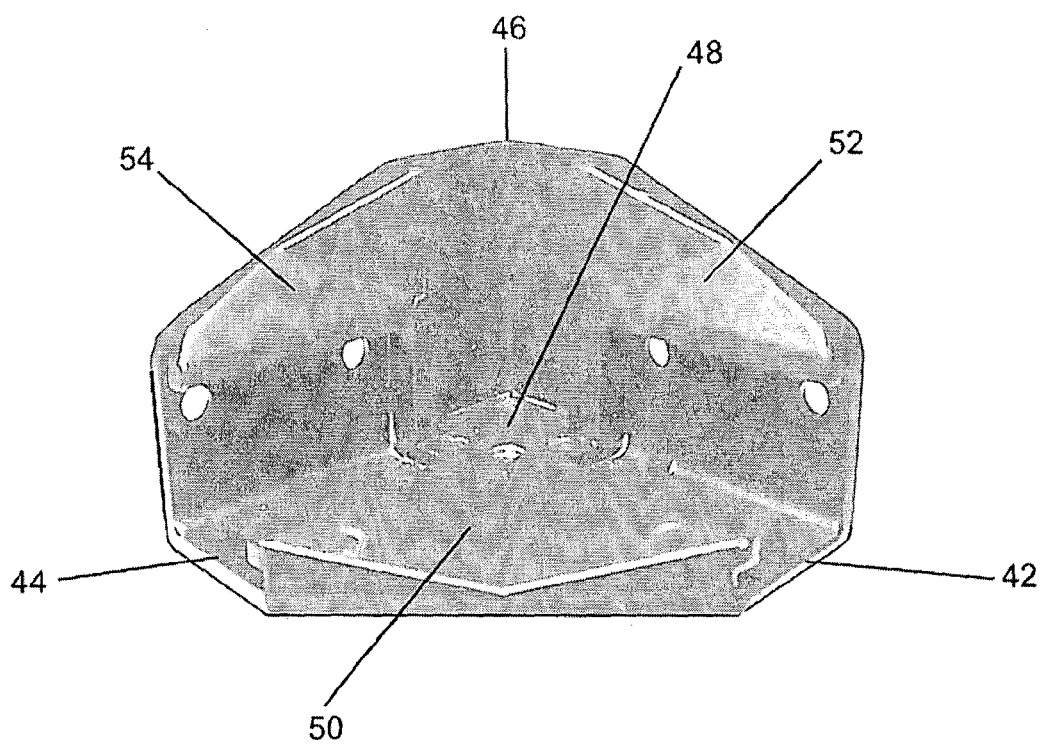

Additional Embodiments are shown in FIGS. 2 and 2A, and FIG. 3. In FIG. 2 and FIG. 2A are views of the interior of the connecting corner and in FIG. 3 a view of industry standard rack rail 58 detailing an industry standard incrementally repeating hole pattern; hole 60, hole 62, hole 64 and marker 66.

There are three rail entry slots; left leg rack rail entry slot 42, right leg rack rail entry slot 44, and vertical leg rack rail entry slot 46. There are three tapered reinforcement ribs; base tapered reinforcement rib 50, left leg tapered reinforcement rib 52, and right leg tapered reinforcement rib 54. Rail stop embossment 48 prevents rack rail inserted in slot 42 and rack rail inserted in slot 44 from contacting each other. Rail stop embossment 48 prevents rack rail inserted in slot 46 from contacting rack rail inserted in slot 42 or rack rail inserted in slot 44.

Slot 42, and slot 44, and slot 46 have an open area and accept rack rail where each leg has an equal dimension. The length of slot is typically one incremental industry standard hole pattern. Slot 42, slot 44, and slot 46, channel rack rail in place and assist in aligning holes in rack rail with adjoining holes in corner.

Ribs 50, and rib 52, and rib 54 are rack rail reinforcement supports, which contribute in distributing the payload equally.

Figure 4:
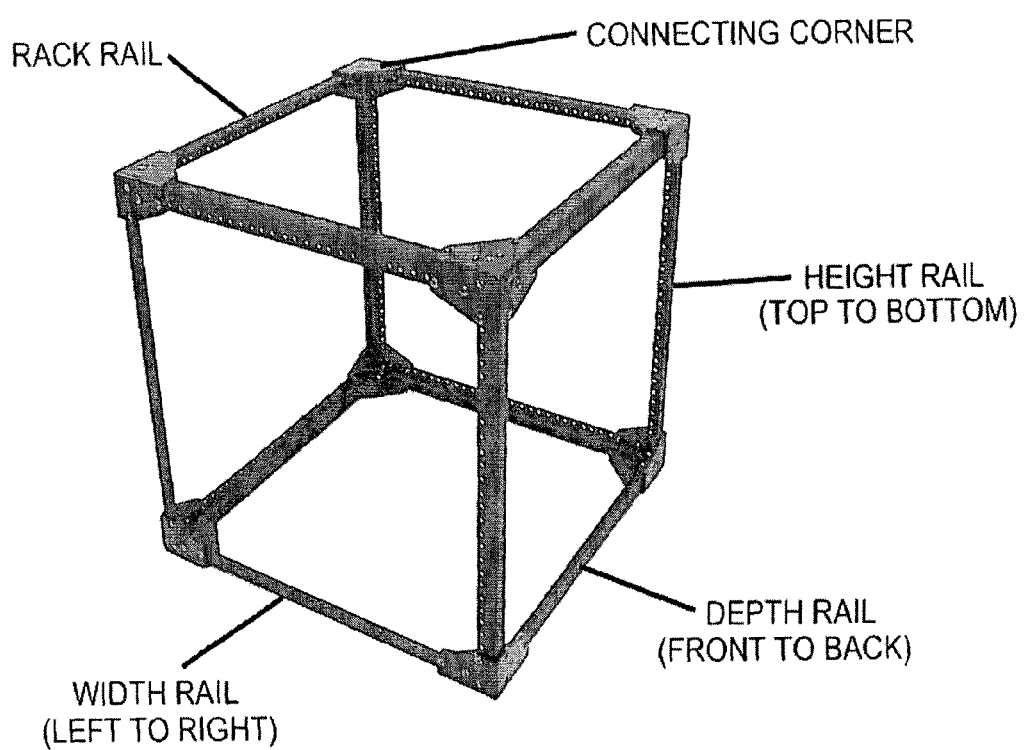
FIG. 4 is a perspective view of a completely assembly rack frame enclosure illustrating the connecting corners and their relationship to industry standard rack rails.

Operation—FIG. 4

The manner of using the connecting corner begins by gathering eight connecting corners and three rack rail sets (each rack rail set consisting of 4 identically sized rack rails). One first positions four corners flat against a work surface, forming a square shape, large enough to be able to slide two rack rails from rail set one (left to right direction) and two rack rails from rail set two (front to back direction) into slot 42 and slot 44 of connecting corners. Next, match up holes of rack rail 58 with holes in slot 42 and slot 44, and hand tighten using screws forming the first of two rectangular frames.

Repeat the process in above paragraph using the other remaining four corners and two remaining rack rails from rail set one, and two remaining rack rails from rail set two. Match up holes of rack rail 58 with holes in slot 42 and slot 44, and hand tighten using screws forming rectangular frame two.

Next, place fully assembled frame one flat against a work surface. Place four rack rails from rail set three (top to bottom direction) in slot 46 of all four corners of frame one.

Lastly, line up and insert rack rails extending from slot 46 of frame one into slot 46 of fully assembled frame two. Once all four rails of both frames are fully inserted and in position, match up holes in rack rails with holes in slot 46, and hand tighten screws completing assembly, which is now prepared and ready to accept installation of various equipment.

ADVANTAGES

From the description above, a number of advantages of the connecting corner become evident:

(a) The connecting corner is constructed to accommodate rack rails in varying sizes, from the very smallest, two increment, industry standard repeating hole pattern, to the currently largest, forty-five increment, repeating hole pattern. However, the ultimate size is limited only by the interest in manufacturing larger sizes due mainly to integral strength concerns. However, the strength and design of the connecting corner give rise to new possibilities and uses for larger rack rail sizes than those currently available.

(b) The knocked down feature allow parts to be shipped in smaller packages. The Packaging can be configured straightforward thereby reducing shipping costs. Packaging for any size rack frame can be broken down into four separate packages. A package containing eight connecting corners and screws and three other packages containing the rack rail sets. The three rack rail packages could be broken down so the first package contains four identical (left to right) rack rails, the second package contains four identical (front to back) rack rails, and the third package contains four identical (top to bottom) rack rails. Each package would be small enough to meet with the size and weight constraints of all presently available parcel package shippers.

(c) A simple Phillips screwdriver is all one needs to completely assemble a rack frame, there is no need for any unusual assembly tools or specialty fasteners.

(d) Rack enclosures are available in industry standard width of nineteen inches. Consequently, these currently available rack enclosures are not designed to be able to accept different width equipment or applications. In addition, knocked down and permanent rack enclosures are available in a hand full of limited depths (front to back direction) sizes, and a hand full of limited heights (top to bottom direction) sizes. Furthermore, currently available rack enclosures are not adaptable or offer interchangeable parts. The connecting corner can accept any combination of industry standard repeating hole pattern increments, of rack rail. The largest, standard sized, currently available rack rail consists of forty-five repeating hole pattern increments. Therefore, allowing for one increment per corner, for assembly purposes, there are forty-three different sizes available in each of the three (left to right, front to back, and top to bottom) directions. Consequently, this amounts to 79,507 (seventy-nine thousand, five-hundred and seven) possible size variations. Accordingly, this allows the consumer tens of thousands more sizes from which to choose.

(e) When two or more rack frames are of the same footprint (left to right, and front to back), the hole placement pattern on the connecting corner can be used to stack these assembled rack frames. The threaded hole in the connecting corners match up with each other, and by using a ordinary bolt and nut combination, the connecting corners can be fixed firmly together. Therefore, smaller and more manageable sized rack frames can be stacked and secured to fit any unusual height constraints or requirements. Thus with access to forty-three rack rail height variations, the possible stackable rack frame combinations, can solve any height requirement challenge.

(f) When two or more rack frames are of the same dimension (front to back, and top to bottom) the hole placement pattern on the connecting corner can be used to group or connect these rack frames together, side-by-side. Match one corner hole from each of the rack frame corners selected to be ganged together. Next, using an ordinary threaded rack screw, from the inside of the chosen hole of the first rack frame corner, position all the way through, and into the other corresponding hole, of the second and adjacent rack frame corner. Lastly, secure both corners using an ordinary equivalent nut. There is no need for any special tools or specially manufactured part to be able to connect two or more rack frames to each other. With access to forty-three rack rail, incremental widths, depths, and height variations, the possible combinations of stacking and securing rack frames on top of each other, or ganging and securing rack frames next to each other is significant.

(g) The connecting corner permits the assembly of a cube shaped rack frame configuration by using equally sized sets of rack rails, which meet the industry standard nineteen-inch equipment width requirement. This provides for optimum versatility and access by being able to load nineteen-inch wide electronic equipment in all six; left and right, front and back, and top and bottom positions.

(h) The flexibility of the connecting corner is impressive. A computer workstation configuration can be established by stacking and securing two additional connecting corners to the top rear corners of an assembled rack frame and then affixing two vertical rack rails and two shelves.

(i) The connecting corner accommodates up to currently 45 increments of rack rail length. Therefore, a rack frame can be constructed using the longest available standard lengths of rack rail to create a framework for a portable office structure, storage facility, or exhibition area by simply securing either solid panels, fabric or textile materials to the assembled frame.

(j) Two rack frames can be used to form a left and right base, and by applying either a top of solid wood, or other material, convert the rack frames into a desk, a counter, or a work surface.

(k) Other Application options include attaching items, such as drawers and shelves.

(l) The threaded hole in the corner can be used to hang rack frames from a ceiling, or permanently attach to a fixed surface.

(m) Many options are available to enhance the overall usability of the rack frame structure. There are casters for mobility and portability, adjustable leveling feet for non-level surfaces, reinforcement braces to increase the weight handling capacity for heavy duty applications, handles, adjustable every increment, for ease in lifting fully loaded rack frames, shelves for partitioning or dividing into sections or compartmental areas, using a variety of incrementally sized metal shelves.

CONCLUSION, RAMIFICATIONS AND SCOPE

Accordingly, the reader will see that the connecting corner of the invention provides a highly flexible and versatile, lightweight and extremely durable, yet economical device that can be used by many consumers in a variety of markets and for multiple applications and configurations. The above description contains much specificity; but should not be construed as limitations as to the scope of the invention, but rather as an exemplification of one preferred embodiment instead.

Many other variations are possible. Case in point, the connecting corner of the invention does not always need to be used in the conventional sense described in the above embodiment, always forming a rectangular or square shaped frame. There can be unusual variations, such as, creating display configuration frames in a stair stepping fashion. An angular patterns in combination with corner, rail, corner, rail, forming a stair stepping progression and using the rails to create hanger poles or unusually shaped retail store display racks.

Vertical frames can be constructed and then connected to each other forming a kiosk stand for mounting industry standard width plasma monitors, visually advertising for example, a business video introduction to a new product line. Additionally, the mounting of a visual plasma display on each of four vertical frames, creating an East, West, North and South visual panoramic view or constructing a wall of rack frames and mounting informational display monitors, such as present in airport terminals, for viewing arrival and departure schedule information.

Other applications can be to hold clear plastic panels. Plastic panels, such as Plexiglas, can be either secured to the holes in the rack rail or simply positioned within the frame structure and held in place by gravity. The rack frame can be hung from a ceiling to display products, out of the consumers reach, either for security purposes, or just for visual effect. Another application could be groups of rack frames ganged side-by-side and hung to hold theater stage lighting fixtures.

The connecting corners can be manufactured in a rainbow of colors and reflective surfaces, such as neon and as exotic as chrome plated, and the corner can vary in size. The slots can be extended to accept two increments in size instead of just one. The reinforcement ribs can be reconfigured by thinning or thickening, altering the shape and size, while still acting effectively as support guides for the rack rails. The materials and material thickness used to construct the corner can be as varied as need be, and either more or less, depending upon the intended application, load requirement, or prospective structural requirements.

The connecting corner can be extended and by correspondingly increasing the maximum rack rail length, incrementally increase the size of the rack frame. Furthermore, the connecting corner has the additional advantages in that it provides a fundamental structure to assemble thousands of sizes of rack frame configurations along with any number of industry standard rack frame sizes.

it allows the connecting corners and rack rails of a fully assembled rack frame to be shipped knocked down significantly reducing the packaging size and cost of shipping versus the costs of freighting one exceedingly large assembled frame package instead.

it permits the use of a simple Phillips screwdriver to assemble the entire rack frame.

it provides for an original alternative to exceed the limited size assortment currently available by introducing an extremely simple, easy and exceptional solution.

it allows for the opportunity to stack rack frames as high as a room height permits.

it allows for the opportunity to gang rack frames side-by-side as far as a room opening permits.

it provides for a cubed configuration allowing for industry standard nineteen inch width equipment to be mounted from every possible position (front, back, right, left, top and bottom).

it permits joining of an extension section, to an existing rack frame configuration, resulting in the creation of a completely new and unique work station configuration.

it permits unconventional rack frame sizes allowing for unusual structural possibilities, such as framework for portable office structures, storage facilities, and exhibition areas.

it provides for sectional or partitioned areas by using optional shelf or drawer additions.

it allows for a threaded hole access to permanently install rack frames or groups of rack frames by hanging from a ceiling or anchoring to a floor.

it provides for access to attach additional optional items such as, casters for portability and mobility, adjustable leveling feet for non-level surface installations, reinforcements braces for increase weight capacity requirements, incrementally adjustable handles for ease in lifting fully loaded rack frames, and incrementally sized metal rack frame shelves to cordon off for compartmentalization purposes.

Although the description above contains many specifications, these should not be interpreted as restricting the scope of the invention but as merely providing illustrations of some of the presently preferred embodiments of this invention. For example, the connecting corner can have other shapes, such as, circular, oval or oblong. The rack rail entry slots can have other shapes that compliment correspondingly shaped rack rails. The reinforcement rib can be replaced by a solid square or rectangular shape.

Thus the scope of the invention should be decided by the appended claims and their legal equivalents, rather that by the illustrations given.

I claim:

1. A corner connector of a rack frame, the rack frame including a plurality of rail members, each rail member of the plurality of rail members having a plurality of holes, comprising in combination:

a base member having a plurality of holes and a reinforcing rib coupled to said base member;

a pair of leg members, each having a plurality of holes, each one of said pair of leg members including a reinforcing rib coupled to each one of said pair of leg members, a first leg member of said pair of leg members substantially perpendicular to a second leg member of said pair of leg members and each one of said pair of leg members substantially perpendicular to said base member;

a portion of said base member including one rail stop, a portion of said one rail stop adjacent to a portion of each one of said pair of leg members;

a portion of said base member and a portion of said first leg member of said pair of leg members having a first inner slot, a portion of said base member and a portion of said second leg member of said pair of leg members having a second inner slot, and a portion of said first leg member and a portion of said second leg member having a third inner slot;

said first inner slot adapted to receive one end of a first rail member of said plurality of rail members of said rack frame, said second inner slot adapted to receive one end of a second rail member of said plurality of rail members of said rack frame and said third inner slot adapted to receive one end of a third rail member of said plurality of rail members of said rack frame, said one rail stop preventing contact of said one end of said first rail member of said rack frame with both said one end of said second rail member of said rack frame and said one end of said third rail member of said rack frame; and a plurality of fasteners adapted to selectively couple said plurality of rail members of said rack frame to said base member and to each one of said pair of leg members of said corner connector thereby providing a corner portion of said rack frame.

2. The corner connector according to claim 1 wherein said base member having at least one threaded hole and said base member of said corner connector is selectively coupled to one of a leveling foot, a caster and an accessory member.

3. The corner connector according to claim 1 wherein said corner connector comprises a material selected from the group consisting of a metal, a plastic and a fiber reinforced plastic.

4. The corner connector according to claim 1 wherein said corner connector comprises aluminum.

5. The corner connector according to claim 1 wherein both said plurality of holes of said base member and said plurality of holes of said pair of leg members have a counter sunk shape to accommodate a head portion of each one of said plurality of fasteners.

6. A rack frame comprising, in combination:
a plurality of rail members, each one of said rail members having a plurality of holes;
a plurality of corner connectors, each one of said plurality of corner connectors including a base member having a plurality of holes and a reinforcing rib coupled to said base member, a pair of leg members, each having a plurality of holes, each one of said pair of leg members including a reinforcing rib coupled to each one of said pair of leg members, a first leg member of said pair of leg members substantially perpendicular to a second leg member of said pair of leg members, each one of said pair of leg members substantially perpendicular to said base member, a portion of said base member and a portion of said first leg member of said pair of leg members having a first inner slot, a portion of said base member and a portion of said second leg member of said pair of leg members having a second inner slot, a portion of said first leg member and a portion of said second leg member having a third inner slot, and a portion of said base member including one rail stop, a portion of said one rail stop adjacent to a portion of each one of said pair of leg members;
said first inner slot of each one of said plurality of corner connectors adapted to receive one end of a first rail member of said plurality of rail members, said second inner slot of each one of said plurality of corner connectors adapted to receive one end of a second rail member of said plurality of rail members and said third inner slot of each one of said plurality of corner connectors adapted to receive one end of a third rail member of said plurality of rail members, said one rail stop preventing contact of said one end of said first rail member with both said one end of said second rail member and said one end of said third rail member; and
a plurality of fasteners adapted to selectively couple each one of said plurality of rail members to said base member and to each one of said pair of leg members of each one of said plurality of corner connectors thereby providing at least a portion of said rack frame.

7. The rack frame according to claim 6 wherein said rack frame comprises at least 8 corner connectors of said plurality of corner connectors, at least 12 rail members of said plurality of rail members and at least 96 fasteners of said plurality of fasteners.

8. The rack frame according to claim 7 wherein each one of said at least 12 rail members of said plurality of rail members having the same length thereby providing a cube shaped rack frame.

9. The rack frame according to claim 7 wherein each one of a first set of 4 rail members of said 12 rail members having the same length and each one of a second set of 8 rail members of said 12 rail members having the same length, said first set of said 12 rail members being of different length to said second set of said 12 rail members thereby providing a rectangular prismatic shaped rack frame.

10. The rack frame according to claim 7 wherein each one of a first set of 4 rail members of said 12 rail members having the same length, each one of a second set of 4 rail members of said 12 rail members having the same length and a third set of 4 rail members of said 12 rail members having the same length, said first set of said 12 rail members being of different length to said second set of said 12 rail members, and said third set of said 12 rail members being of different length to both said first set of 4 rail members and said second set of 4 rail members thereby providing a rectangular prismatic shaped rack frame.

11. The rack frame according to claim 6 wherein said base member of each one of said plurality of corner connectors having at least one threaded hole and said base member of each one of said plurality of corner connectors is selectively coupled to one of a leveling foot, a caster and an accessory member.

12. The rack frame according to claim 6 wherein each one said plurality of corner connectors comprises a material selected from the group consisting of a metal, a plastic and a fiber reinforced plastic.

13. The rack frame according to claim 6 wherein each one said plurality of corner connectors comprises aluminum.

14. The rack frame according to claim 6 wherein both said plurality of holes of said base member and said plurality of holes of said pair of leg members of each one of said plurality of corner connectors has a counter sunk shape to accommodate a head portion of each one of said plurality of fasteners.

15. The rack frame according to claim 6 wherein each one of said plurality of rail members is substanlially L-shaped and thereby adapted to conform to each one of said inner slots of each one of said plurality of corner connectors.

16. A method for assembling a frame rack comprising the steps of:
providing a plurality of rail members, each one of said rail members having a plurality of holes;
providing a plurality of corner connectors, each one of said plurality of corner connectors including a base member having a plurality of holes and a reinforcing rib coupled to said base member, a pair of leg members, each having a plurality of holes, each one of said pair of leg members including a reinforcing rib coupled to each one of said pair of leg members, a first leg member of said pair of leg members substantially perpendicular to a second leg member of said pair of leg members, each one of said pair of leg members substantially perpendicular to said base member, a portion of said base member and a portion of said first leg member of said pair of leg members having a first inner slot, a portion of said base member and a portion of said second leg member of said pair of leg members having a second inner slot, a portion of said first leg member and a portion of said second leg member having a third inner slot, and a portion of said base member including one rail stop, a portion of said one rail stop adjacent to a portion of each one of said pair of leg members;

providing said first inner slot of each one of said plurality of corner connectors adapted to receive one end of a first rail member of said plurality of rail members, said second inner slot of each one of said plurality of corner connectors adapted to receive one end of a second rail member of said plurality of rail members and said third inner slot of each one of said plurality of corner connectors adapted to receive one end of a third rail member of said plurality of rail members, said one rail stop preventing contact of said one end of said first rail member with both said one end of said second rail member and said one end of said third rail member; and providing a plurality of fasteners adapted to selectively couple each one of said plurality of rail members to said base member and to each one of said pair of leg members of each one of said plurality of corner connectors thereby providing at least a portion of said rack frame.

17. The method according to claim 16 further comprising the steps of:

coupling a first set of four rail members of said plurality of rail members to four of said corner connectors of said plurality of corner connectors with a plurality of fasteners thereby forming a first frame;

coupling a second set of four rail members of said plurality of rail members to a further four corner connectors of said plurality of corner connectors with a plurality of fasteners thereby forming a second frame; and coupling one end of each one of a third set of four rail members of said plurality of rail members to said four corner connectors of said first frame and an opposite end of each one of said third set of four rail members of said plurality of rail members to said further four corner connectors of said second frame thereby forming said rack frame.

18. The method according to claim 17 further comprising the steps of:

providing said base member of each one of said plurality of corner connectors having at least one threaded hole; and selectively coupling said base member of each one of said plurality of corner connectors to one of a leveling foot, a caster and an accessory member.

* * * * *